United States Patent
Lin et al.

(10) Patent No.: US 8,073,888 B2
(45) Date of Patent: Dec. 6, 2011

(54) RANDOM NUMBER GENERATOR AND RANDOM NUMBER GENERATING METHOD THEREOF

(75) Inventors: Yu-Tong Lin, Hsinchu County (TW); Yu-Chia Liu, Kaohsiung (TW)

(73) Assignee: Phison Electronics Corp., Miaoli (TW)

( * ) Notice: Subject to any disclaimer, the term of this patent is extended or adjusted under 35 U.S.C. 154(b) by 1001 days.

(21) Appl. No.: 11/972,374

(22) Filed: Jan. 10, 2008

(65) Prior Publication Data

US 2009/0157782 A1    Jun. 18, 2009

(30) Foreign Application Priority Data

Dec. 12, 2007    (TW) ................................ 96147473 A

(51) Int. Cl.
*G06F 7/58* (2006.01)
(52) U.S. Cl. ........................................................ 708/251
(58) Field of Classification Search ........... 708/250–256
See application file for complete search history.

(56) References Cited

U.S. PATENT DOCUMENTS

| | | | | |
|---|---|---|---|---|
| 5,706,218 | A * | 1/1998 | Hoffman | 708/251 |
| 6,188,294 | B1 * | 2/2001 | Ryan et al. | 708/250 |
| 6,195,669 | B1 * | 2/2001 | Onodera et al. | 708/250 |
| 6,369,727 | B1 | 4/2002 | Vincze | 341/131 |
| 7,099,906 | B2 * | 8/2006 | Messina et al. | 708/255 |
| 2007/0067375 | A1 * | 3/2007 | Inaoka et al. | 708/250 |
| 2007/0180009 | A1 * | 8/2007 | Gutnik | 708/250 |
| 2008/0010331 | A1 * | 1/2008 | Janke et al. | 708/250 |
| 2010/0146025 | A1 * | 6/2010 | Ergun | 708/251 |

OTHER PUBLICATIONS

Chinese First Examination Report of China Application No. 2007103001913, dated Sep. 25, 2009.

* cited by examiner

*Primary Examiner* — Tan V Mai
(74) *Attorney, Agent, or Firm* — J.C. Patents

(57) ABSTRACT

A random number generator and a random number generating method thereof are provided. The random number generator includes a signal generating unit and a sampling unit. The signal generating unit is adapted for memorizing a status of a noise generated during a transient of an output signal of an output buffer, and accordingly generating a frequency conversion signal which changes according to time and ambient factors. The sampling unit is coupled to the signal generating unit for receiving the frequency conversion signal, and sampling the frequency conversion signal according to a sampling clock pulse, so as to obtain a plurality of sets of unpredictable random number codes.

20 Claims, 11 Drawing Sheets

രrandomRANDOM NUMBER GENERATOR AND
RANDOM NUMBER GENERATING METHOD
THEREOF

CROSS-REFERENCE TO RELATED APPLICATION

This application claims the priority benefit of Taiwan application serial no. 96147473, filed on Dec. 12, 2007. The entirety of the above-mentioned patent application is hereby incorporated by reference herein and made a part of this specification.

BACKGROUND OF THE INVENTION

1. Field of the Invention

The present invention generally relates to a random number generator and a random number generating method thereof, and more particularly, to a random number generator having a memorized noise, and a random number generating method thereof.

2. Description of Related Art

Living in a globalizing era of information explosion, human beings are more dependent on the computers and networks for convenience and popularity of electronic transactions. In order to secure each of the electronic transactions, the record of the transaction is often edited with random numbers. Conventionally, a pure digital circuit is often employed in producing the random numbers. However, random numbers produced in this conventional approach must be a loop of $2^N$, in which N represents the byte number of the random number. In this manner, these random numbers conventionally obtained by the pure digital circuit are mostly predictable. And therefore, being threatened by the security risk derived from the predictable random numbers, the security of the electronic transactions won't be guaranteed any more.

SUMMARY OF THE INVENTION

Accordingly, the present invention is directed to a random number generator, and a random number generating method thereof, which are adapted for generating unpredictable random numbers.

The present invention provides a random number generator. The random number generator includes a signal generating unit and a sampling unit. The signal generating unit is adapted for memorizing a status of a noise generated during a transient of an output signal of an output buffer, and accordingly generating a frequency conversion signal which changes according to time and ambient factors. The sampling unit is coupled to the signal generating unit for receiving the frequency conversion signal, and sampling the frequency conversion signal according to a sampling clock pulse, so as to obtain a plurality of sets of random number codes.

According to an embodiment of the present invention, the signal generating unit includes a memory unit, a conversion unit, and an oscillation unit. The memory unit is adapted for memorizing the status of the noise, and accordingly generating a noise voltage which varies according to time. The conversion unit is coupled to the memory unit for receiving and converting the noise voltage, and accordingly obtaining a conversion current which varies according to the ambient factor. The ambient factor includes temperature and/or an ambient light. The oscillation unit is coupled to the conversion unit for receiving the conversion current and generating the frequency conversion signal according to the received conversion current.

According to an embodiment of the present invention, the memory unit includes a first PMOS transistor, a capacitor, and a first resistor. The first PMOS transistor includes a body, a source, a drain, and a gate a body. The body of the first PMOS transistor is coupled to a system voltage of the output buffer. The source of the first PMOS transistor is coupled to a core system voltage of a pre-driver of the output buffer. The gate of the first PMOS transistor is coupled to an output system voltage of an output driver of the output buffer. The capacitor includes a first terminal coupled to a drain of the first PMOS transistor and storing the noise voltage therein, and a second terminal coupled to a reference level of the output buffer. The first resistor is parallel connected with the capacitor.

According to an embodiment of the present invention, the conversion unit includes a first NMOS transistor, a second PMOS transistor, a third PMOS transistor, a current source, a second NMOS transistor, a PNP bipolar junction transistor, a third NMOS transistor, and a second resistor. The first NMOS transistor includes a gate, a source, and a drain. The gate of the first NMOS transistor is coupled to the drain of the first PMOS transistor. The source of the first NMOS transistor is coupled to the reference level. The second PMOS transistor includes a gate, a source, and a drain. The gate and the drain of the second PMOS transistor are coupled to the drain of the first NMOS transistor, and the source of the second PMOS transistor is coupled to the system voltage.

The third PMOS transistor includes a gate, a source, and a drain. The gate of the third PMOS transistor is coupled to the gate of the second PMOS transistor. The source of the third PMOS transistor is coupled to the system voltage. The drain of the third PMOS transistor is adapted for outputting the converted current. The current source has a terminal coupled to the system voltage, and another terminal coupled to the gate and the drain of the second NMOS transistor. The PNP bipolar junction transistor includes an emitter, a collector and a base. The emitter of the PNP bipolar junction transistor is coupled to the source of the second NMOS transistor, and the base and the collector of the PNP bipolar junction transistor are coupled to the reference level. The third NMOS transistor includes a gate, a source, and a drain. The gate of the third NMOS transistor is coupled to the gate of the second NMOS transistor. The drain of the third NMOS transistor is coupled to the drain of the first NMOS transistor. The second resistor is coupled between the source of the third NMOS transistor and the reference level.

According to an embodiment of the present invention, the oscillation unit includes a fourth NMOS transistor, a fifth NMOS transistor, a sixth NMOS transistor, a seventh NMOS transistor, an eighth NMOS transistor, a ninth NMOS transistor, a tenth NMOS transistor, a fourth PMOS transistor, a fifth PMOS transistor, and a sixth PMOS transistor, each having a gate, a source, and a drain. The gate and the drain of the fourth NMOS transistor are coupled to the drain of the third PMOS transistor, and the source of the fourth NMOS transistor is coupled to the reference level. The gate of the fifth NMOS transistor is coupled to the gate of the fourth NMOS transistor, and the source of the fifth NMOS transistor is coupled to the reference level.

The gate of the sixth NMOS transistor is coupled to the gate of the fourth NMOS transistor, and the source of the sixth NMOS transistor is coupled to the reference level. The gate of the seventh NMOS transistor is coupled to the gate of the fourth NMOS transistor, and the source of the seventh NMOS transistor is coupled to the reference level. The source of the eighth NMOS transistor is coupled to the drain of the fifth NMOS transistor. The source of the ninth NMOS transistor is coupled to the drain of the sixth NMOS transistor. The source of the tenth NMOS transistor is coupled to the drain of the seventh NMOS transistor.

The gate of the fourth PMOS transistor is coupled to the gate of the eighth NMOS transistor. The source of the fourth PMOS transistor is coupled to the system voltage, and the drain of the fourth PMOS transistor is coupled to the drain of the eighth NMOS transistor. The gate of the fifth PMOS transistor is coupled to the gate of the ninth NMOS transistor and the drain of the fourth PMOS transistor. The source of the fifth PMOS transistor is coupled to the system voltage, and the drain of the fifth PMOS transistor is coupled to the drain of the ninth NMOS transistor. The gate of the sixth PMOS transistor is coupled to the gate of the tenth NMOS transistor and the drain of the fifth PMOS transistor. The source of the sixth PMOS transistor is coupled to the system voltage, and the drain of the sixth PMOS transistor is coupled to the drain of the tenth NMOS transistor and the gate of the fourth PMOS transistor for outputting the frequency conversion signal.

The present invention provides a random number generator. The random number generator includes a signal generating unit and a sampling unit. The signal generating unit is adapted for memorizing a status of a noise generated during a transient of an output signal of the output buffer, and accordingly generating a frequency conversion signal which changes according to time. The sampling unit is coupled to the signal generating unit for receiving the frequency conversion signal, and sampling the frequency conversion signal according to a sampling clock pulse so as to obtain a plurality of sets of random number codes.

According to an embodiment of the present invention, the signal generating unit includes a memory unit, and an oscillation unit. The memory unit is adapted for memorizing the status of the noise, and accordingly generating a noise voltage which varies according to time. The oscillation unit is coupled to the memory unit, for receiving the noise voltage, and generating the frequency conversion signal according to the received noise voltage.

According to an embodiment of the present invention, the memory unit includes a first PMOS transistor, a capacitor, and a resistor. The first PMOS transistor includes a body, a source, a drain, and a gate a body. The body of the first PMOS transistor is coupled to a system voltage of the output buffer. The source of the first PMOS transistor is coupled to a core system voltage of a pre-driver of the output buffer. The gate of the first PMOS transistor is coupled to an output system voltage of an output driver of the output buffer. The capacitor includes a first terminal coupled to a drain of the first PMOS transistor and storing the noise voltage therein, and a second terminal coupled to a reference level of the output buffer. The resistor is parallel connected with the capacitor.

According to an embodiment of the present invention, the oscillation unit includes a first NMOS transistor, a second NMOS transistor, a third NMOS transistor, a fourth NMOS, a fifth NMOS transistor, a sixth NMOS transistor, a second PMOS transistor, a third PMOS transistor, and a fourth PMOS transistor, each having a gate, a source, and a drain. The gate of the first NMOS transistor is coupled to the drain of the first PMOS transistor. The gate of the second NMOS transistor is coupled to the gate of the first NMOS transistor, and the source of the second NMOS transistor is coupled to the reference level. The gate of the third NMOS transistor is coupled to the gate of the first NMOS transistor, and the source of the third NMOS transistor is coupled to the reference level.

The source of the fourth NMOS transistor is coupled to the drain of the first NMOS transistor. The source of the fifth NMOS transistor is coupled to the drain of the second NMOS transistor. The source of the sixth NMOS transistor is coupled to the drain of the third NMOS transistor. The gate of the second PMOS transistor is coupled to the gate of the fourth NMOS transistor, the source of the second PMOS transistor is coupled to the system voltage, and a drain of the second PMOS transistor is coupled to the drain of the fourth NMOS transistor.

The gate of the third PMOS transistor is coupled to the gate of the fifth NMOS transistor and the drain of the second PMOS transistor, the source of the third PMOS transistor is coupled to the system voltage, and the drain of the third PMOS transistor is coupled to the drain of the fifth NMOS transistor. The gate of the fourth PMOS transistor is coupled to the gate of the sixth NMOS transistor and the drain of the third PMOS transistor, the source of the fourth PMOS transistor is coupled to the system voltage, and the drain of the fourth PMOS transistor is coupled to the drain of the sixth NMOS transistor and the gate of the second PMOS transistor, and thus outputting the frequency conversion signal thereby.

The present invention provides a random number generator. The random number generator includes a signal generating unit and a sampling unit. The signal generating unit is adapted for generating a frequency conversion signal which changes according to an ambient factor. The sampling unit is coupled to the signal generating unit, for receiving the frequency conversion signal, and sampling the frequency conversion signal according to a sampling clock pulse, so as to obtain a plurality of sets of random number codes.

According to an embodiment of the present invention, the signal generating unit includes a current generating unit, and an oscillation unit. The current generating unit is adapted for generating a reference oscillation current which varies according to the ambient factor, e.g., temperature and/or light. The oscillation unit is coupled to the current generating unit, for receiving the reference oscillation current, and generating the frequency conversion signal according to the reference oscillation signal.

According to an embodiment of the present invention, the current generating unit includes a first PMOS transistor, a second PMOS transistor, a current source, a first NMOS transistor, a PNP bipolar junction transistor, a second NMOS transistor, and a resistor. The first PMOS transistor includes a source coupled to a system voltage of an output buffer. The second PMOS transistor includes a gate coupled to a gate and a drain of the first PMOS transistor. The second PMOS transistor further includes a source coupled to the system voltage. The drain of the first PMOS transistor is adapted for outputting the reference oscillation current.

The current source has a first terminal coupled to the system voltage. The first NMOS transistor includes a gate, a source and a drain. The gate and the drain of the first NMOS transistor are coupled to a second terminal of the current source. The PNP bipolar junction transistor includes an emitter coupled to the drain of the first NMOS transistor, a base and a collector coupled to a reference level. The second NMOS transistor includes a gate, a source and a drain. The gate of the second NMOS transistor is coupled to the gate of the first NMOS transistor; the drain of the second NMOS transistor is coupled to the drain of the first PMOS transistor. The resistor is coupled between the source of the second NMOS transistor and the reference level.

According to an embodiment of the present invention, the oscillation unit includes a third NMOS transistor, a fourth NMOS transistor, a fifth NMOS transistor, a sixth NMOS transistor, a seventh NMOS transistor, an eighth NMOS transistor, a ninth NMOS transistor, a third PMOS transistor, a fourth PMOS transistor, and a fifth PMOS transistor, each of which including a gate, a source, and a drain. The gate and the drain of the third NMOS transistor are coupled to the drain of the second PMOS transistor, and the source of the third NMOS transistor is coupled to the reference level. The gate of the fourth NMOS transistor is coupled to the gate of the third NMOS transistor, and the source of the fourth NMOS transistor is coupled to the reference level.

The gate of the fifth NMOS transistor is coupled to the gate of the third NMOS transistor, and the source of the fifth NMOS transistor is coupled to the reference level. The gate of the sixth NMOS transistor is coupled to the gate of the third NMOS transistor, and the source of the sixth NMOS transistor is coupled to the reference level. The source of the seventh NMOS transistor is coupled to the drain of the fourth NMOS transistor. The source of the eighth NMOS transistor is coupled to the drain of the fifth NMOS transistor. The source of the ninth NMOS transistor is coupled to the drain of the sixth NMOS transistor.

The gate of the third PMOS transistor is coupled to the gate of the seventh NMOS transistor, the source of the third PMOS transistor is coupled to the system voltage, and the drain of the third PMOS transistor is coupled to the drain of the seventh NMOS transistor. The gate of the fourth PMOS transistor is coupled to the gate of the eighth NMOS transistor and the drain of the third PMOS transistor, the source of the fourth PMOS transistor is coupled to the system voltage, and the drain of the fourth PMOS transistor is coupled to the drain of the eighth NMOS transistor. The gate of the fifth PMOS transistor is coupled to the gate of the ninth NMOS transistor and the drain of the fourth PMOS transistor, the source of the fifth PMOS transistor is coupled to the system voltage, and the drain of the fifth PMOS transistor is coupled to the drain of the NMOS transistor and the gate of the third PMOS transistor, and outputs the frequency conversion signals thereby.

According to an aspect of the foregoing embodiments, the sampling unit includes a plurality of D flip-flops, in which a data output terminal of an $i^{th}$ D flip-flop is coupled to a data input terminal of an $(i+1)^{th}$ D flip-flop, the data input terminal of the $1^{st}$ D flip-flop receives the frequency conversion signal, clock pulse receiving terminals of the D flip-flops receive the sampling clock pulses at the same time, the data output terminals of the D flip-flops are adapted for outputting the random numbers, wherein i is a positive integer.

According to an aspect of the foregoing embodiments, the random number generator is adapted for an electronic apparatus and a smart card.

The present invention further provides a method for generating a random number. The method includes the steps of: memorizing a status of a noise generated during a transient of an output signal of the output buffer; and generating a frequency conversion signal which varies according to time and ambient factors, e.g., temperature and/or light; and then sampling the frequency conversion signal according to a sampling clock pulse to obtain a plurality of sets of random number codes.

The present invention further provides a method for generating a random number. The method includes the steps of: memorizing a status of a noise generated during a transient of an output signal of the output buffer, and generating a frequency conversion signal which varies as time changes; and then sampling the frequency conversion signal according to a sampling clock pulse to obtain a plurality of sets of random number codes.

The present invention further provides a method for generating a random number. The method includes the steps of: providing a frequency conversion signal which varies as an ambient factor changes; and then sampling the frequency conversion signal according to a sampling clock pulse to obtain a plurality of sets of random number codes.

In order to obtain unpredictable random numbers, the present invention provides a random number generator according to time and ambient factors, and a random number generating method thereof. The present invention employs a memory unit to memorize a status of a noise generated during a transient of an output signal of the output buffer, and then generates a noise voltage which varies as time changes; and employs a conversion unit to receive and converse the noise voltage outputted from the memory unit, so as to obtain a conversion current which varies according to the ambient factors, e.g., temperature and/or light.

The present invention further employs an oscillation unit to receive the conversion current outputted from the conversion unit, and thus generating the frequency conversion signal according to the received conversion current. Finally, a sampling unit receives the frequency conversion signal generated by the oscillation unit, and samples the frequency conversion signal with a stable sampling clock pulse. In such a way, a plurality of sets of unpredictable random numbers can be obtained.

Besides, the present invention alternatively provides a random number generator according to time or ambient factors only, as well as a random number generating method thereof. All of the random number generators provided by the present invention and the random number generating methods thereof are adapted for producing unpredictable random numbers, and are adapted for drastically improving the security of electronic transactions.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
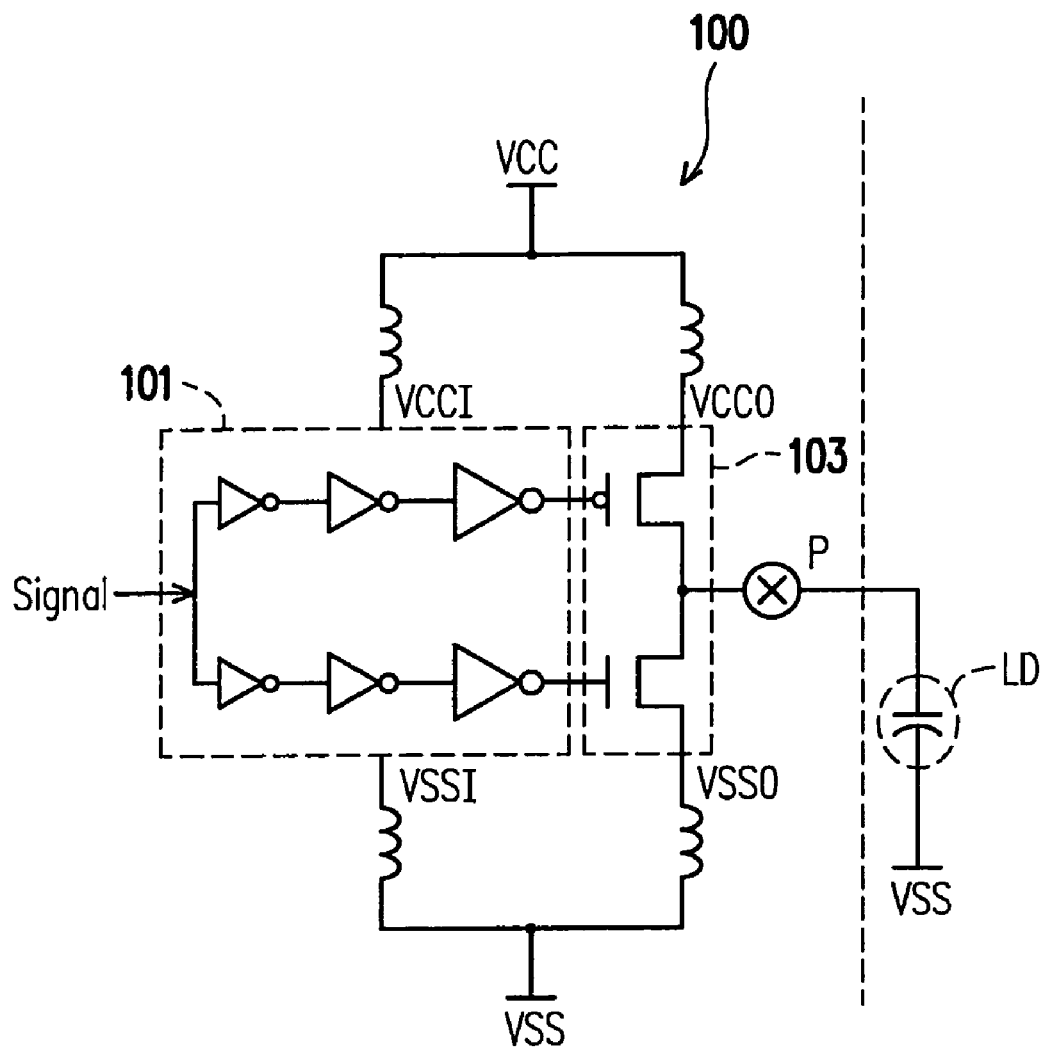
FIG. 1 is a schematic structural diagram illustrating an output buffer.

Reference will now be made in detail to the present preferred embodiments of the invention, examples of which are illustrated in the accompanying drawings. Wherever possible, the same reference numbers are used in the drawings and the description to refer to the same or like parts.

The present invention is mainly subject to produce unpredictable random number codes, so as to improve security of electronic transactions.

For the purpose of producing unpredictable random number codes, the present invention provides a random number generator having a memorized noise. The memorized noise is originated from an output buffer of a control chip transferring signals outwardly. Because an external load of the control chip is much greater than an internal load of the control chip, the control chip relies on the output buffer to improve a driving capability for the external load, so that the control chip can transfer the signal to the external load. As such, the output buffer is very often the strongest source of noise of the control chip. Of course, this memorized noise can be originated from another source, such as a switch power supply, a clock pulse control IC, etc.

FIG. 1 is a schematic structural diagram illustrating an output buffer. Referring to FIG. 1, there is shown an output buffer 100 including a pre-driver 101 and an output driver 103. The legend VCC represents a system voltage of the output buffer 100. The legend VCCI represents a core system voltage of the pre-driver 101. The legend VCCO represents an output system voltage, i.e., pad voltage. The legend VSS represents a reference level of the output buffer 100. The legend VSSI represents a core reference level of the pre-driver 101. The legend VSSO represents an output reference level of the output driver 103. The legend P represents a pad.

The output driver 103 is subject to directly drive an external load LD of a control chip. Therefore, the output driver 103 should be featured with a very large driving current capability. Correspondingly, during a transient of output signals of the output buffer 100, the output system voltage VCCO of the output driver 103 is the position of the entire control chip where generates the strongest noise. Besides, the strength of the noise may also be relative with a parasite inductance, marked with legends for inductors in FIG. 1 and caused by a bonding process when packaging the control chip, and the capacity of the load LD.

Figure 2:
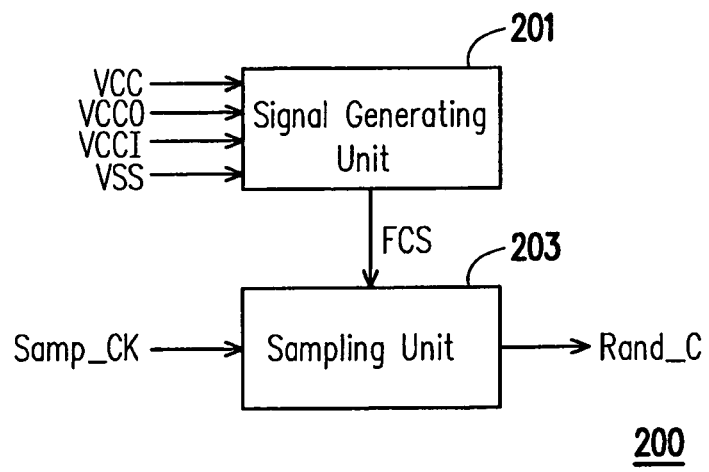
FIG. 2 is a block diagram illustrating a random number generator according to an embodiment of the present invention.

FIG. 2 is a block diagram illustrating a random number generator 200 according to an embodiment of the present invention. Referring to FIGS. 1 and 2 together, there is shown in FIG. 2 a random number generator 200 including a signal generating unit 201 and a sampling unit 203. The signal generating unit 201 is adapted for memorizing a status of a noise generated during a transient of an output signal of the output buffer 100, and generating a frequency conversion signal FCS which varies according to time and ambient factors, e.g., temperature and/or light, in accordance with the memorized status of the noise. The sampling unit 203 is coupled to the signal generating unit 201 for receiving frequency conversion signal FCS generated by the signal generating unit 201, and sampling the frequency conversion signal FCS according to a sampling clock pulse Samp_CK, and thus obtaining a plurality of sets of random number codes. According to an aspect of the embodiment, a frequency of the sampling clock pulse Samp_CK can be either lower or higher than a frequency of the frequency conversion signal FCS.

Figure 3:
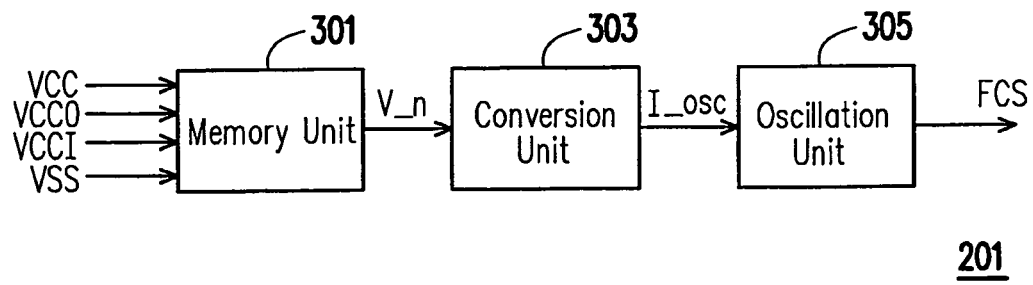
FIG. 3 is a block diagram illustrating a signal generating unit according to an embodiment of the present invention.

FIG. 3 is a block diagram illustrating a signal generating unit 201 according to an embodiment of the present invention. Referring FIGS. 1 through 3 together, the signal generating unit 201 includes a memory unit 301, a conversion unit 303, and an oscillation unit 305. The memory unit 301 is adapted for memorizing a status of a noise generated during a transient of an output signal of the output buffer 100, and generating a noise voltage V_n which varies according to time in accordance with the memorized status of the noise. The conversion unit 303 is coupled to the memory unit 301 for receiving and converting the noise voltage V_n so as to obtain a conversion current I_osc which varies according to an ambient factor, e.g., temperature and/or light. The oscillation unit 305 is coupled to the conversion unit 303 for receiving the conversion current I_osc, and generating the frequency conversion signal FCS according to the received conversion current I_osc.

Figure 4:
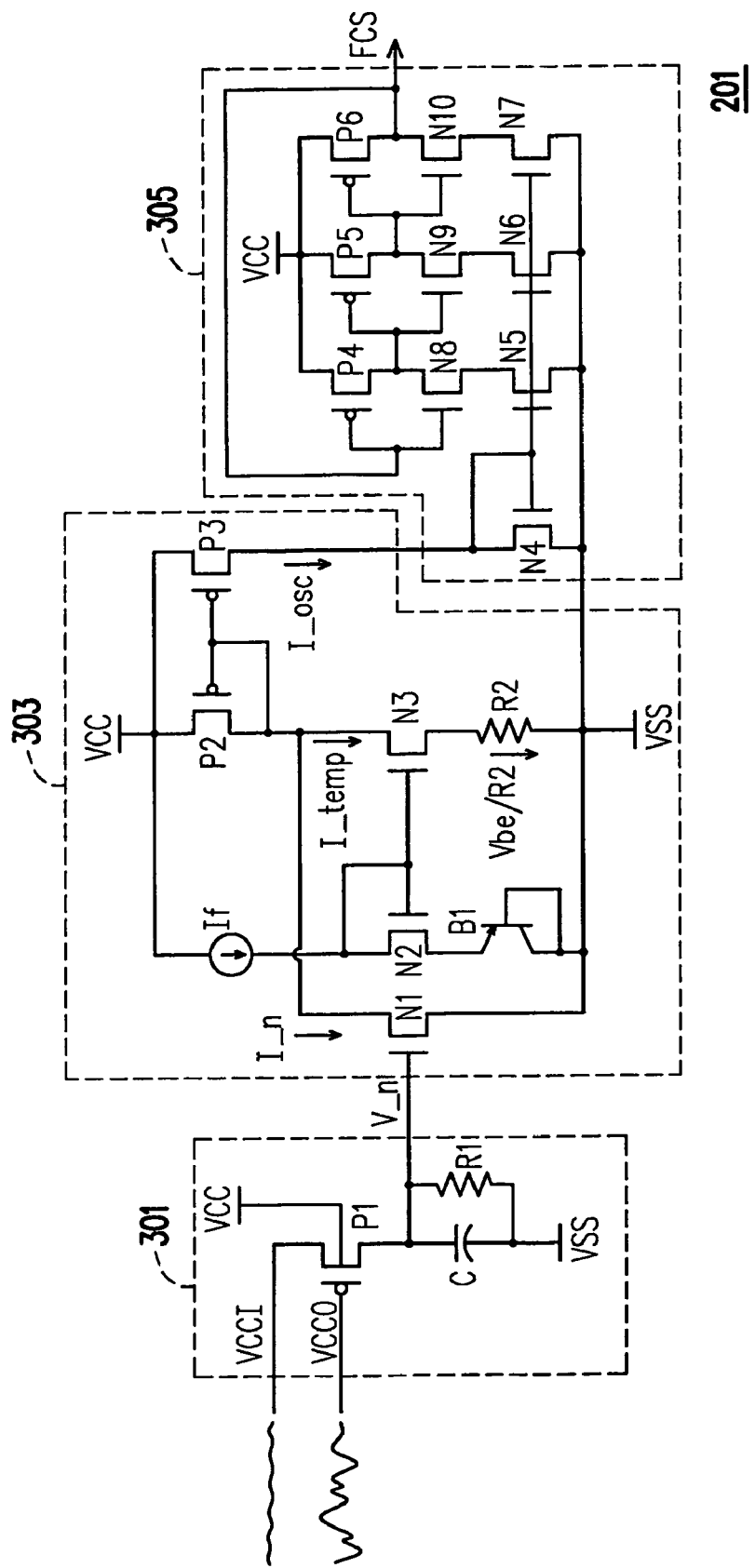
FIG. 4 is a circuit diagram illustrating details of the signal generating unit and a memory unit, a conversion unit, and an oscillation unit thereof according to an embodiment of the present invention.

FIG. 4 is a circuit diagram illustrating details of the signal generating unit 201 and a memory unit 301, a conversion unit 303, and an oscillation unit 305 thereof according to an embodiment of the present invention. Referring to FIGS. 1 through 4, the memory unit 301 includes a PMOS transistor P1, a capacitor C, and a resistor R1. A body of the PMOS transistor P1 is coupled to the system voltage VCC of the output buffer 100.

The PMOS transistor P1 includes a body, a source, a drain, and a gate. The body of the first PMOS transistor is coupled to a system voltage of the output buffer VCC. The source of the PMOS transistor P1 is coupled to the core system voltage VCCI of the pre-driver 101 of the output buffer 100. The gate of the PMOS transistor P1 is coupled to the output system voltage VCCO of the output driver 103 of the output buffer 100. The drain of the PMOS transistor P1 is coupled to the capacitor C and a first terminal of the resistor R1 and generating the noise voltage V_n thereby. The capacitor C and a second terminal of the resistor R1 are coupled to the reference level VSS of the output buffer 100.

According to an aspect of the embodiment, the conversion unit 303 includes NMOS transistors N1 through N3, PMOS transistors P2 and P3, a current source If, a PNP bipolar junction transistor B1, and a resistor R2. Each of the NMOS transistors N1 through N3, PMOS transistors P2 and P3 includes a gate, a source, and a drain. The gate of the NMOS transistor N1 is coupled to the drain of the PMOS transistor P1. The source of the NMOS transistor N1 is coupled to the reference level VSS of the output buffer 100. The drain of the NMOS transistor N1 is coupled to the drain and the gate of the PMOS transistor P2, the gate of the PMOS transistor P3, and the drain of the NMOS transistor N3. The sources of the PMOS transistors P2 and P3 are coupled to the system voltage VCC of the output buffer 100. The drain of the PMOS transistor P3 is adapted for outputting the conversion current I_osc.

The current source If has a first terminal coupled to the system voltage VCC of the output buffer 100, and a second terminal coupled to the gate and the drain of the NMOS transistor N2, and the gate of the NMOS transistor N3. The PNP bipolar junction transistor B1 includes an emitter coupled to the source of the NMOS transistor N2, a base and a collector coupled to the reference level VSS of the output buffer 100. The source of the NMOS transistor N3 is coupled to a first terminal of the resistor R2. A second terminal of the resistor R2 is coupled to the reference level VSS of the output buffer 100.

The oscillation unit 305, according to an aspect of the embodiment, includes NMOS transistors N4 through N10, and PMOS transistors P4 through P6. Each of the NMOS transistors N4 through N10, and PMOS transistors P4 through P6, has a gate, a source, and a drain. The drain and the gate of the NMOS transistor N4 are coupled to the drain of the PMOS transistor P3. The source of the NMOS transistor N4 is coupled to the reference level VSS of the output buffer 100. The gates of the NMOS transistors N5 through N7 are coupled to the gate of the NMOS transistor N4. The sources of the NMOS transistors N5 through N7 are coupled to the reference level VSS of the output buffer 100.

Each of the NMOS transistors N8 through N10 and PMOS transistors P4 through P6 includes a gate, a source, and a drain. The sources of the NMOS transistors N8 through N10 are correspondingly coupled to the drains of the PMOS transistors P4 through P6, respectively. The sources of the PMOS transistors P4 through P6 are coupled to the system level VCC of the output buffer 100. The gate of the NMOS transistor N8 is coupled to the gate of the PMOS transistor P4, and the drains of the NMOS transistor N10 and PMOS transistor P6, and outputs the frequency conversion signal FCS. The gate of the NMOS transistor N9 is coupled to the gate of the PMOS transistor P5, and drains of the NMOS transistor N8 and PMOS transistor P4 respectively. The gate of the NMOS transistor N10 is coupled to the gate of the PMOS transistor P6, and the drains of the NMOS transistor N9 and the PMOS transistor P5 respectively.

Figure 5:
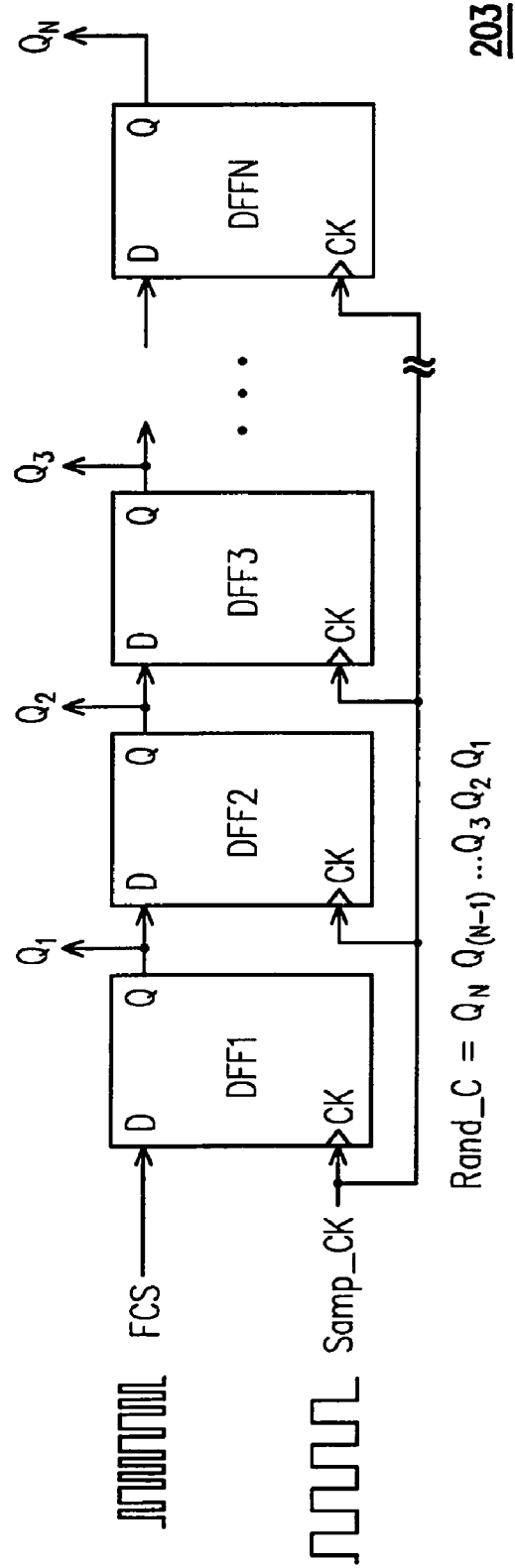
FIG. 5 is a circuit diagram illustrating an internal circuit of a sampling unit according to an embodiment of the present invention.

FIG. 5 is a circuit diagram illustrating an internal circuit of a sampling unit 203 according to an embodiment of the present invention. Referring to FIGS. 1 through 5, there is shown a sampling unit 203. The sampling unit 203 includes a plurality of D flip-flops DFF1 through DFFN each having a data input terminal D, a data output terminal Q and a clock pulse receiving terminal CK, in which the data output terminal Q of the $i^{th}$ D flip-flop is coupled to the data input terminal D of the $(i+1)^{th}$ D flip-flop, wherein i and N are positive integers. For example, the data output terminal Q of the $1^{st}$ D flip-flop DFF1 is coupled to the data input terminal D of the $2^{nd}$ D flip-flop DFF2; the data output terminal Q of the $2^{nd}$ D flip-flop DFF2 is coupled to the data input terminal D of the $3^{rd}$ D flip-flop DFF3; . . . ; and the data output terminal Q of the $(N-1)^{th}$ D flip-flop DFF(N-1) is coupled to the data input terminal D of the $N^{th}$ D flip-flop DFFN.

Further, the data input terminal D of the $1^{st}$ D flip-flop DFF1 is adapted for receiving the frequency conversion signal FCS generated by the signal generating unit 201. The clock pulse receiving terminals CK of all of the D flip-flops DFF1 through DFFN simultaneously receive the sampling clock pulses Samp_CK. In other words, the D flip-flops DFF1 through DFFN act synchronously. The data output terminals Q of the D flip-flops DFF1 through DFFN are adapted for outputting the random number codes Rand_C. According to an aspect of the embodiment, the random number codes Rand_C can be codes of $Q_N Q_{(N-1)} \ldots Q_3 Q_2 Q_1$, or $Q_1 Q_2 Q_3 \ldots Q_{(N-1)}$, or even codes combined from $Q_N Q_{(N-1)} \ldots Q_3 Q_2 Q_1$.

According to an aspect of the embodiment, during the transient of the output signal of the output buffer 100, the PMOS transistor P1 converts a difference between AC signals, i.e., noises, of the system voltage VCCO and the core system voltage VCCI respectively, into currents of different values to charge the capacitor C. In such a way, the capacitor C stores a noise voltage V_n corresponding to the noise. It should be noted that the noise voltage V_n does not only upwardly accumulate. In other words, when the output signal of the output buffer 100 is at a stable status, the noise voltage V_n stored in the capacitor C discharges via the resistor R1.

As such, it can be known from the above description that when the output signal of the output buffer 100 has transients, the noise voltage V_n is gradually accumulated, while otherwise when the output signal of the output buffer 100 has no transients, the noise voltage V_n is gradually descendent. In such a way, in different time points, the memory unit 301 generates noise voltages of different values. In other words, the noise voltage V_n varies according to time.

Then, the noise voltage V_n is taken as a bias voltage required for turning on the NMOS transistor N1, and therefore the noise voltage V_n stored in the capacitor C is converted into a noise current I_n. Furthermore, the current source If is taken by the conversion unit 303 as a bias current for turning on the PNP bipolar junction transistor B1. Because the PNP bipolar junction transistor B1 is featured with a base-emitter voltage $V_{be}$ having a very high temperature coefficient, the base-emitter voltage $V_{be}$ is converted into a temperature current I_temp even when the ambient temperature changes only a little.

It should be further noted that the PNP bipolar junction transistor B1 may be alternatively designed as a component which can be affected by ambient light. For example, the PNP bipolar junction transistor B1 is complied in a form of bare chip, or alternatively the PNP bipolar junction transistor B1 is configured with a hole at the black gel encapsulant. In such a way, the PNP bipolar junction transistor B1 can be affected by ambient light, and thus changing the value of the temperature current I_temp.

As discussed above, it can be learnt that the conversion current I_osc outputted from the conversion unit 303 includes components of the noise current I_n and the temperature current I_temp, that can be represented by the equation I_osc=I_n+I_temp. As such, the conversion unit 303 outputs conversion current of different values at different ambient temperatures. In other words, the conversion current I_osc varies according to the ambient temperature.

Then, the oscillation unit 305 which is composed of a three stage ring oscillator is used to receive the conversion current I_osc outputted from the conversion unit 303, and generate the frequency conversion signal FCS according to the received conversion current I_osc. As such, at different time and different ambient temperature, the oscillation unit 305 generates frequency conversion signals FCS including components relative to the temperature and accumulated noises, and the frequency conversion signals FCS are different in accordance with the times and ambient temperatures.

Finally, the frequency conversion signal FCS generated by the oscillation unit 305 is provided to the data input terminal D of the D flip-flop DFF1. Then a plurality of sets of random number codes Rand_C can be obtained by sampling the frequency conversion signal FCS with the sampling clock pulse Samp_CK. As such, the random number codes Rand_C obtained from the random number generator 200 according to the embodiment of the present invention not only vary according to time and ambient temperature, but also are unpredictable.

Figure 6:
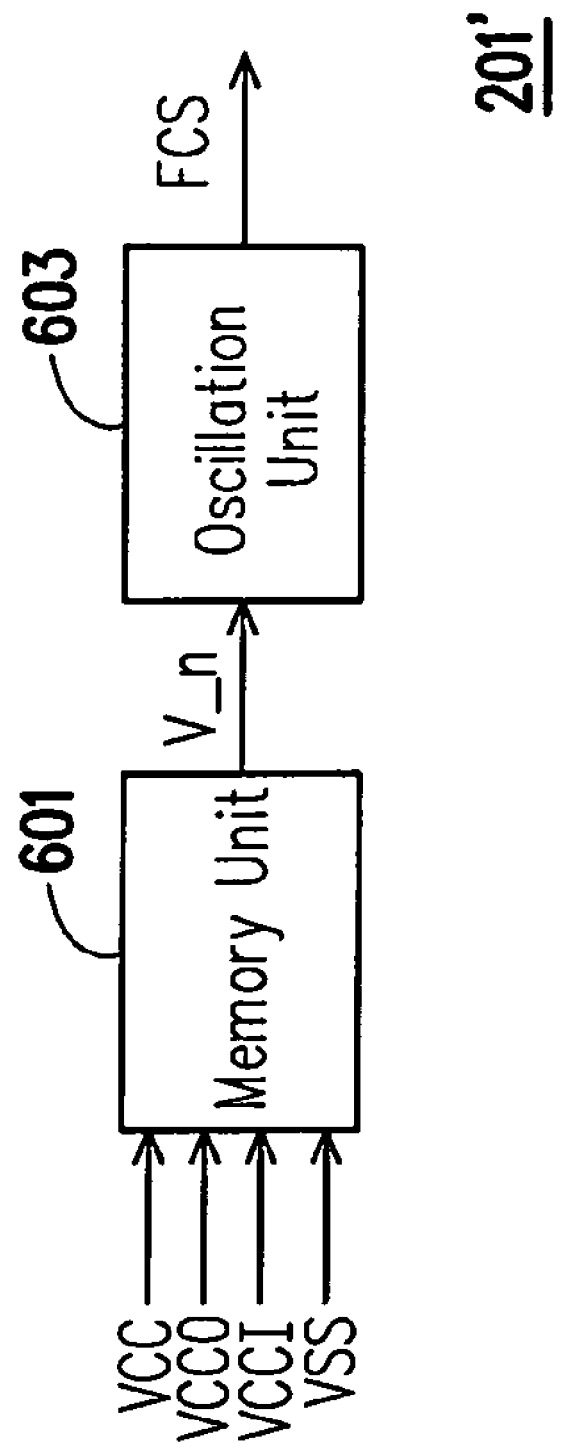
FIG. 6 is a block diagram illustrating a signal generating unit according to another embodiment of the present invention.
Figure 7:
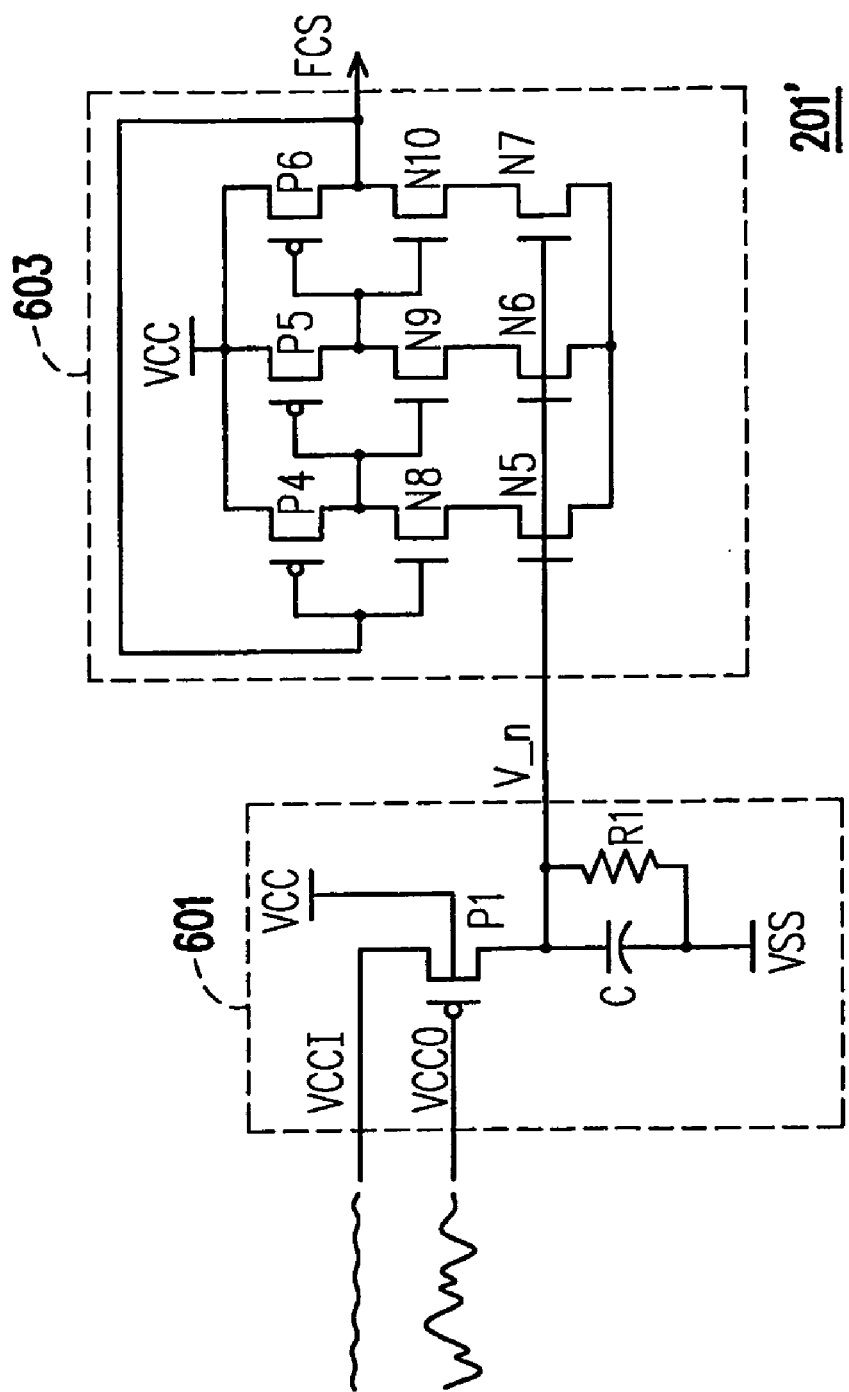
FIG. 7 is a circuit diagram illustrating an internal circuit of the signal generating unit of FIG. 6.

However, the present invention should not be merely restricted as illustrated by the above disclosed embodiments. FIG. 6 is a block diagram illustrating a signal generating unit 201' according to another embodiment of the present invention. FIG. 7 is a circuit diagram illustrating an internal circuit of the signal generating unit 201' of FIG. 6. Referring to FIGS. 1, 2, 4, 6, and 7 together, the signal generating unit 201' includes a memory unit 601 and an oscillation unit 603. The memory unit 601 and the oscillation unit 603 are similar with the memory unit 301 and the oscillation unit 305 as shown in FIG. 4, except that, as shown in FIG. 7, the noise voltage V_n generated by the memory unit 601 is directly provided to the gate of the NMOS transistor N5 of the oscillation unit 603. In such a way, with the signal generating unit 201', the random number codes Rand_C obtained from the random number generator 200 according to the embodiment of the present invention not only vary according to time, but also are unpredictable.

Figure 8:
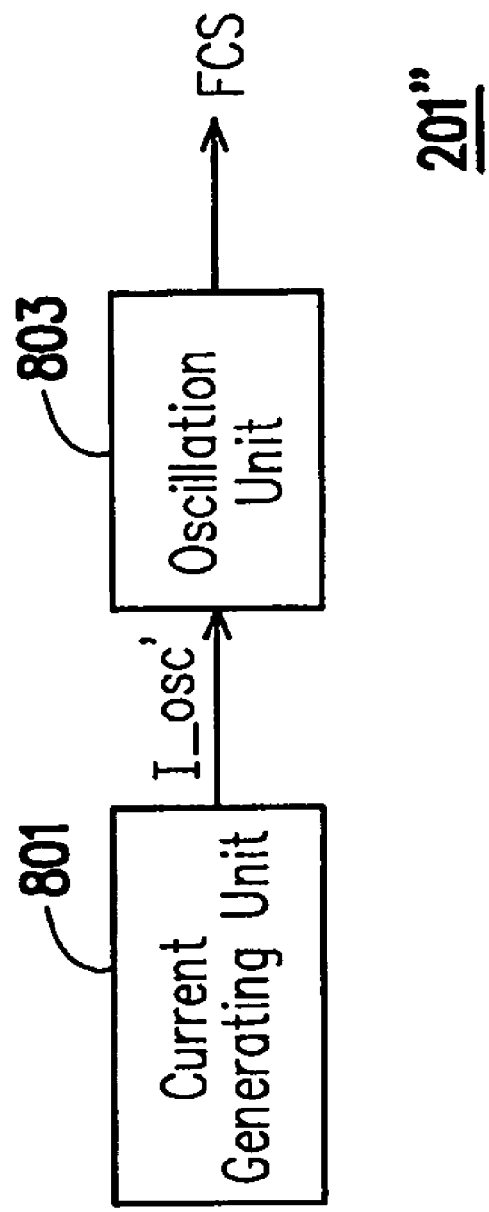
FIG. 8 is a circuit diagram illustrating an internal circuit of a signal generating unit according to another embodiment of the present invention.
Figure 9:
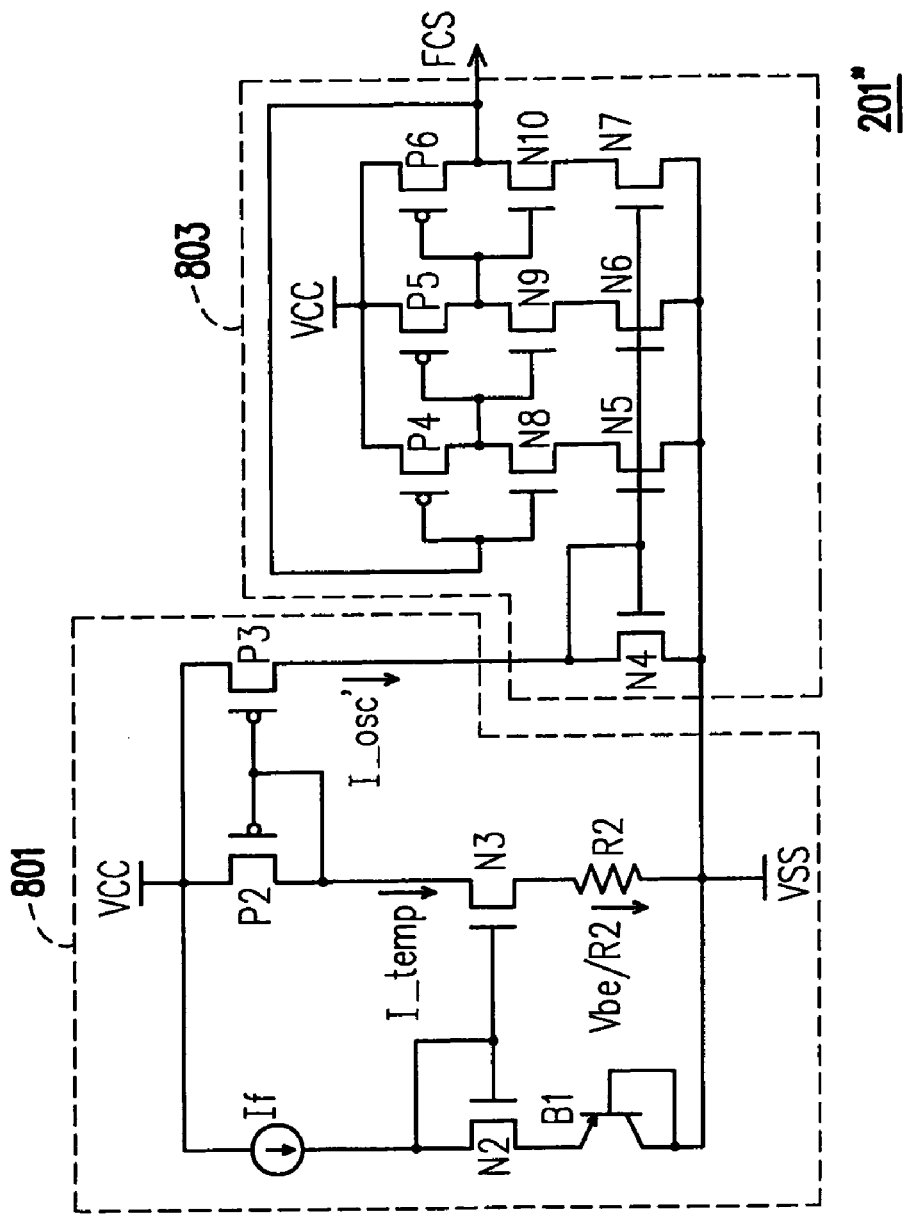
FIG. 9 is a circuit diagram illustrating an internal circuit of the signal generating unit of FIG. 8.

Alternatively, FIG. 8 is a circuit diagram illustrating an internal circuit of a signal generating unit 201" according to another embodiment of the present invention. FIG. 9 is a circuit diagram illustrating an internal circuit of the signal generating unit 201" of FIG. 8. Referring to FIGS. 2, 4, 8, and 9 together, the signal generating unit 201" includes a current generating unit 801 and an oscillation unit 803. The current generating unit 801 has a similar circuit structure of the conversion unit 303 as shown in FIG. 4, except that, as shown in FIG. 9, the current generating unit 801 does not have the NMOS transistor N1 of the conversion unit 303. As such, the current generating unit 801 finally outputs a reference oscillation current I_osc' including the component of the temperature current I_temp only, that can be represented by the equation I_osc'=I_temp.

Further, the oscillation unit 803 has similar function and circuit structure as the oscillation unit 305 as shown in FIG. 4, and thus is not to be iterated hereby. As such, with the signal generating unit 201", the random number codes Rand_C obtained from the random number generator 200 according to the embodiment of the present invention not only vary according to an ambient factor, e.g., temperature and/or ambient light, but also are unpredictable.

Figure 10:
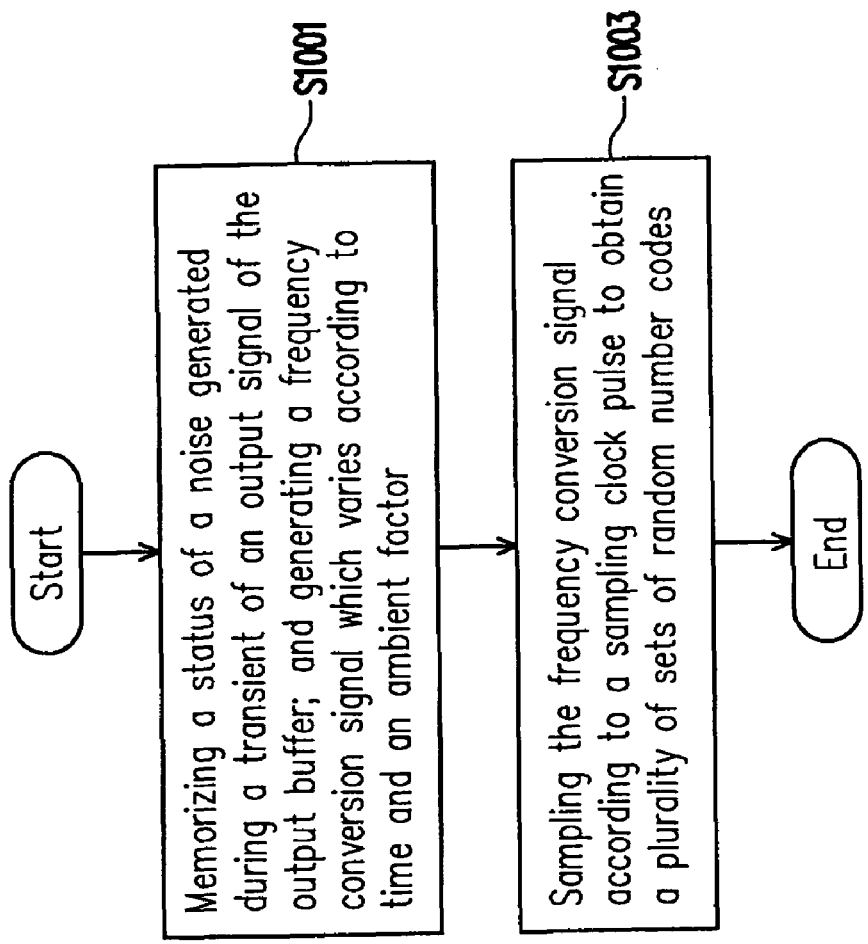
FIG. 10 is a flow chart illustrating a first random number generating method according to an embodiment of the present invention.

As taught above, three different methods for generating random numbers have been proposed. FIG. 10 is a flow chart illustrating a first random number generating method according to an embodiment of the present invention. Referring to FIG. 10, the first random number generating method includes: at step S1001, memorizing a status of a noise generated during a transient of an output signal of the output buffer, and accordingly generating a frequency conversion signal which changes according to time and ambient factors; and then at step S1003 sampling the frequency conversion signal with a sampling clock pulse, so as to obtain a plurality of sets of random number codes. A frequency of the sampling clock pulse can be either higher than or lower than a frequency of the frequency conversion signal.

Figure 11:
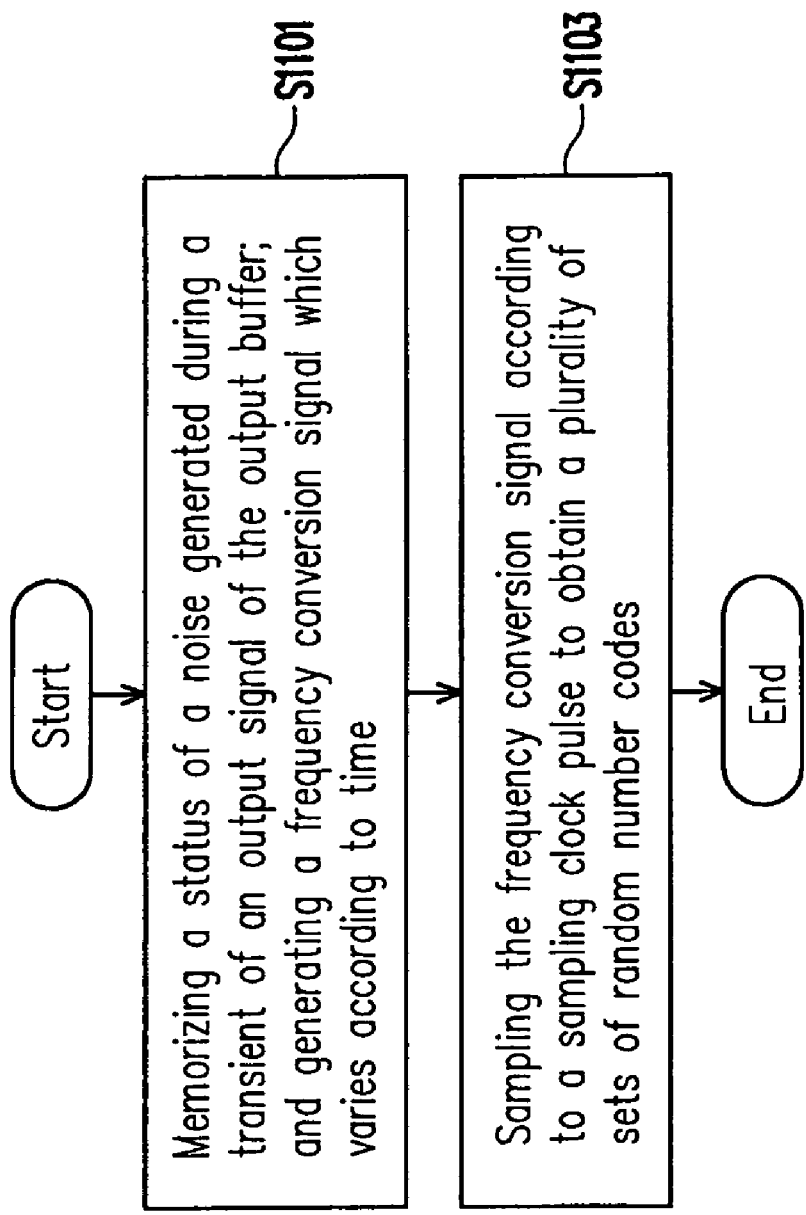
FIG. 11 is a flow chart illustrating a second random number generating method according to an embodiment of the present invention.

FIG. 11 is a flow chart illustrating a second random number generating method according to an embodiment of the present invention. Referring to FIG. 11, the second random number generating method includes: at step S1101, memorizing a status of a noise generated during a transient of an output signal of the output buffer, and accordingly generating a frequency conversion signal which changes according to time; and then at step S1103 sampling the frequency conversion signal with a sampling clock pulse, so as to obtain a plurality of sets of random number codes. A frequency of the sampling clock pulse can be either higher than or lower than a frequency of the frequency conversion signal.

Figure 12:
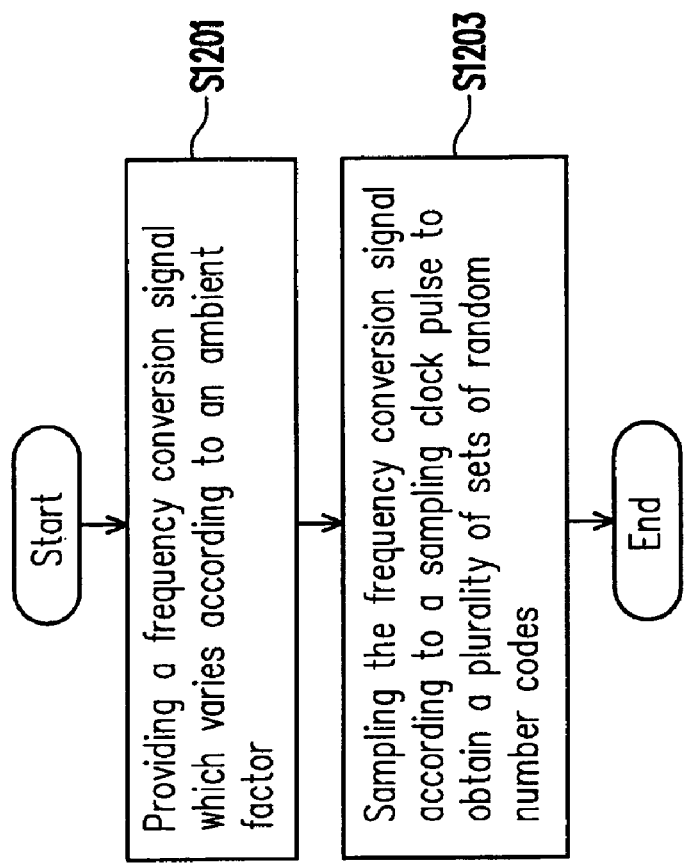
FIG. 12 is a flow chart illustrating a third random number generating method according to an embodiment of the present invention.

FIG. 12 is a flow chart illustrating a third random number generating method according to an embodiment of the present invention. Referring to FIG. 12, the third random number generating method includes: at step S1201, providing a frequency conversion signal which varies according to an ambient factor, e.g., temperature and/or ambient light; and then at step S1203 sampling the frequency conversion signal with a sampling clock pulse, so as to obtain a plurality of sets of random number codes. A frequency of the sampling clock pulse can be either higher than or lower than a frequency of the frequency conversion signal.

As described above, the random number generator and the random generating method according to the present invention are adapted for producing unpredictable random number codes. As such, the random number generator and the random generating method according to the present invention are adapted for any electronic apparatus which requires random number codes for protection of secured data processing in accordance with the spirit of the present invention.

It should be further noted that smart cards which are very popular recently generally provide functions including identifying cardholder's personal information (e.g., storing cardholder's password, fingerprints, voice), storing money in electronic forms (e.g., electronic purse, pre-paid card), and storing/processing data. In order to further guarantee the security of electronic transactions with such a smart card, any smart card can include the random number generator according to the present invention therein and/or applies the random number generating method according to the present invention. Such a smart card, protected with protection provided by the random number generator according to the present invention, cannot be copied by unauthorized individuals, and thus is within the scope of the present invention.

In summary, in order to produce unpredictable random number codes, the present invention provides a random number generator which varies according to both the time and an ambient factor, and a random number generating method thereof. The present invention employs a memory unit for memorizing a status of a noise generated during a transient of an output signal of the output buffer, and accordingly generating a noise voltage which changes according to time; and employs a conversion unit for receiving and converting the noise voltage outputted from the memory unit, so as to obtain a conversion current which varies according to an ambient factor, e.g., temperature and/or ambient light.

Thereafter, an oscillation unit receives the conversion current outputted from the conversion unit, and generates the frequency conversion signal according to the received conversion current. Finally, the sampling unit receives the frequency conversion signal outputted from the oscillation unit, and samples the received frequency conversion signal with a stable sampling clock pulse, and thus obtaining a plurality of sets of unpredictable random number codes.

Furthermore, the present invention also provides random number generators varies according to time or an ambient factor only, and the random generating method thereof, which can also generate unpredictable random number codes. The random number generators and the random generating methods thereof are adapted for generating a plurality of sets of unpredictable random number codes, and therefore can be used for drastically improving security of electronic transactions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A random number generator, comprising:
  a signal generating unit, adapted for memorizing a status of
    a noise generated during a transient of an output signal of an output buffer, and accordingly generating a frequency conversion signal which changes according to time and an ambient factor; and a sampling unit, coupled to the signal generating unit, for receiving the frequency conversion signal, and sampling the frequency conversion signal according to a sampling clock pulse, so as to obtain a plurality of sets of random number codes, wherein the signal generating unit comprises:

a memory unit, adapted for accumulating and descending the status of the noise, and accordingly generating a noise voltage which varies according to time;

a conversion unit, coupled to the memory unit, for receiving and converting the noise voltage, and accordingly obtaining a conversion current which varies according to the ambient factor, wherein the ambient factor comprises temperature and/or an ambient light; and an oscillation unit, coupled to the conversion unit, for receiving the conversion current, and generating the frequency conversion signal according to the received conversion current.

2. The random number generator according to claim 1, wherein the memory unit comprises:

a first PMOS transistor having a body, a source, a drain, and a gate, wherein the body of the first PMOS transistor is coupled to a system voltage of the output buffer, the source of the first PMOS transistor is coupled to a core system voltage of a pre-driver of the output buffer, and the gate of the first PMOS transistor is coupled to an output system voltage of an output driver of the output buffer;

a capacitor having a first terminal coupled to the drain of the first PMOS transistor and storing the noise voltage, and a second terminal thereof coupled to a reference level of the output buffer; and a first resistor parallel connected with the capacitor.

3. The random number generator according to claim 2, wherein the conversion unit comprises:

a first NMOS transistor having a gate, a source, and a drain, wherein the gate of the first NMOS transistor is coupled to the drain of the first PMOS transistor, and the source of the first NMOS transistor is coupled to the reference level;

a second PMOS transistor having a gate, a source, and a drain, wherein the gate and the drain of the second PMOS transistor are coupled to the drain of the first NMOS transistor, and the source of the second PMOS transistor is coupled to the system voltage;

a third PMOS transistor having a gate, a source, and a drain, wherein the gate of the third PMOS transistor is coupled to the gate of the second PMOS transistor, the source of the third PMOS transistor is coupled to the system voltage, and the drain of the third PMOS transistor is adapted for outputting the converted current;

a current source having a terminal coupled to the system voltage;

a second NMOS transistor having a gate, a source, and a drain, wherein the gate and the drain of the second NMOS transistor are coupled to another terminal of the current source;

a PNP bipolar junction transistor having an emitter, a collector and a base, wherein the emitter of the PNP bipolar junction transistor is coupled to the source of the second NMOS transistor, and the base and the collector of the PNP bipolar junction transistor are coupled to the reference level;

a third NMOS transistor having a gate, a source, and a drain, wherein the gate of the third NMOS transistor is coupled to the gate of the second NMOS transistor, and the drain of the third NMOS transistor is coupled to the drain of the first NMOS transistor; and a second resistor coupled between the source of the third NMOS transistor and the reference level.

4. The random number generator according to claim 3, wherein the oscillation unit comprises:

a fourth NMOS transistor, having a gate, a source, and a drain, wherein the gate and the drain of the fourth NMOS transistor are coupled to the drain of the third PMOS transistor, and the source of the fourth NMOS transistor is coupled to the reference level;

a fifth NMOS transistor, having a gate, a source, and a drain, wherein the gate of the fifth NMOS transistor is coupled to the gate of the fourth NMOS transistor, and the source of the fifth NMOS transistor is coupled to the reference level;

a sixth NMOS transistor, having a gate, a source, and a drain, wherein the gate of the sixth NMOS transistor is coupled to the gate of the fourth NMOS transistor, and the source of the sixth NMOS transistor is coupled to the reference level;

a seventh NMOS transistor, having a gate, a source, and a drain, wherein the gate of the seventh NMOS transistor is coupled to the gate of the fourth NMOS transistor, and the source of the seventh NMOS transistor is coupled to the reference level;

an eighth NMOS transistor, having a gate, a source, and a drain, wherein the source of the eighth NMOS transistor is coupled to the drain of the fifth NMOS transistor;

a ninth NMOS transistor, having a gate, a source, and a drain, wherein the source of the ninth NMOS transistor is coupled to the drain of the sixth NMOS transistor;

a tenth NMOS transistor, having a gate, a source, and a drain, wherein the source of the tenth NMOS transistor is coupled to the drain of the seventh NMOS transistor;

a fourth PMOS transistor, having a gate, a source, and a drain, wherein the gate of the fourth PMOS transistor is coupled to the gate of the eighth NMOS transistor, the source of the fourth PMOS transistor is coupled to the system voltage, and the drain of the fourth PMOS transistor is coupled to the drain of the eighth NMOS transistor;

a fifth PMOS transistor, having a gate, a source, and a drain, wherein the gate of the fifth PMOS transistor is coupled to the gate of the ninth NMOS transistor and the drain of the fourth PMOS transistor, the source of the fifth PMOS transistor is coupled to the system voltage, and the drain of the fifth PMOS transistor is coupled to the drain of the ninth NMOS transistor; and a sixth PMOS transistor, having a gate, a source, and a drain, wherein the gate of the sixth PMOS transistor is coupled to the gate of the tenth NMOS transistor and the drain of the fifth PMOS transistor, the source of the sixth PMOS transistor is coupled to the system voltage, and the drain of the sixth PMOS transistor is coupled to the drain of the tenth NMOS transistor and the gate of the fourth PMOS transistor for outputting the frequency conversion signal.

5. The random number generator according to claim 4, wherein the sampling unit comprises a plurality of D flip-flops, wherein a data output terminal of the $i^{th}$ D flip-flop is coupled to a data input terminal of the $(i+1)^{th}$ D flip-flop; the data input terminal of the $1^{st}$ D flip-flop receives the frequency conversion signal; clock pulse receiving terminals of the D flip-flops receive the sampling clock pulses at the same time; the data output terminals of the D flip-flops are adapted for outputting the random numbers, wherein i is a positive integer.

6. The random number generator according to claim 5, wherein the random number generator is applied in an electronic apparatus or a smart card.

7. A random number generator, comprising:
a signal generating unit, adapted for memorizing a status of a noise generated during a transient of an output signal of the output buffer, and accordingly generating a frequency conversion signal which changes according to time; and
a sampling unit, coupled to the signal generating unit, for receiving the frequency conversion signal, and sampling the frequency conversion signal according to a sampling clock pulse, so as to obtain a plurality of sets of random number codes,
wherein the signal generating unit comprises:
a memory unit, adapted for accumulating and descending the status of the noise, and accordingly generating a noise voltage which varies according to time; and
an oscillation unit, coupled to the memory unit, for receiving the noise voltage, and generating the frequency conversion signal according to the received noise voltage.

8. The random number generator according to claim 7, wherein the memory unit comprises:
a first PMOS transistor having a body, a source, a drain, and a gate, wherein the body of the first PMOS transistor is coupled to a system voltage of the output buffer, the source of the first PMOS transistor is coupled to a core system voltage of a pre-driver of the output buffer, and the gate of the first PMOS transistor is coupled to an output system voltage of an output driver of the output buffer;
a capacitor having a first terminal coupled to the drain of the first PMOS transistor and storing the noise voltage, and a second terminal thereof coupled to a reference level of the output buffer; and
a resistor parallel connected with the capacitor.

9. The random number generator according to claim 8, wherein the oscillation unit comprises:
a first NMOS transistor, having a gate, a source, and a drain, wherein the gate of the first NMOS transistor is coupled to the drain of the first PMOS transistor;
a second NMOS transistor, having a gate, a source, and a drain, wherein the gate of the second NMOS transistor is coupled to the gate of the first NMOS transistor, and the source of the second NMOS transistor is coupled to the reference level;
a third NMOS transistor, having a gate, a source, and a drain, wherein the gate of the third NMOS transistor is coupled to the gate of the first NMOS transistor, and the source of the third NMOS transistor is coupled to the reference level;
a fourth NMOS, having a gate, a source, and a drain, wherein the source of the fourth NMOS transistor is coupled to the drain of the first NMOS transistor;
a fifth NMOS transistor, having a gate, a source, and a drain, wherein the source of the fifth NMOS transistor is coupled to the drain of the second NMOS transistor;
a sixth NMOS transistor, having a gate, a source, and a drain, wherein the source of the sixth NMOS transistor is coupled to the drain of the third NMOS transistor;
a second PMOS transistor, having a gate, a source, and a drain, wherein the gate of the second PMOS transistor is coupled to the gate of the fourth NMOS transistor, the source of the second PMOS transistor is coupled to the system voltage, and a drain of the second PMOS transistor is coupled to the drain of the fourth NMOS transistor;
a third PMOS transistor, having a gate, a source, and a drain, wherein the gate of the third PMOS transistor is coupled to the gate of the fifth NMOS transistor and the drain of the second PMOS transistor, the source of the third PMOS transistor is coupled to the system voltage, and the drain of the third PMOS transistor is coupled to the drain of the fifth NMOS transistor; and
a fourth PMOS transistor, having a gate, a source, and a drain, wherein the gate of the fourth PMOS transistor is coupled to the gate of the sixth NMOS transistor and the drain of the third PMOS transistor, the source of the fourth PMOS transistor is coupled to the system voltage, and the drain of the fourth PMOS transistor is coupled to the drain of the sixth NMOS transistor and the gate of the second PMOS transistor, and outputting the frequency conversion signal thereby.

10. The random number generator according to claim 9, wherein the sampling unit comprises a plurality of D flip-flops, wherein a data output terminal of the $i^{th}$ D flip-flop is coupled to a data input terminal of the $(i+1)^{th}$ D flip-flop; the data input terminal of the $1^{st}$ D flip-flop receives the frequency conversion signal; clock pulse receiving terminals of the D flip-flops receive the sampling clock pulses at the same time; the data output terminals of the D flip-flops are adapted for outputting the random numbers, wherein i is a positive integer.

11. The random number generator according to claim 10, wherein the random number generator is applied in an electronic apparatus or a smart card.

12. A random number generator, comprising:
a signal generating unit, adapted for generating a frequency conversion signal which changes according to an ambient factor; and
a sampling unit, coupled to the signal generating unit, for receiving the frequency conversion signal, and sampling the frequency conversion signal according to a sampling clock pulse, so as to obtain a plurality of sets of random number codes,
wherein the signal generating unit comprises:
a current generating unit, adapted for generating a reference oscillation current which varies according to the ambient factor, wherein the ambient factor comprises temperature and/or an ambient light; and
an oscillation unit, coupled to the current generating unit, for receiving the reference oscillation current, and generating the frequency conversion signal according to the reference oscillation signal.

13. The random number generator according to claim 12, wherein the current generating unit comprises:
a first PMOS transistor, having a gate, a source and a drain, wherein the source of the first PMOS transistor is coupled to a system voltage of an output buffer;
a second PMOS transistor, having a gate, a source and a drain, wherein the gate of the second PMOS transistor is coupled to the gate and the drain of the first PMOS transistor;
a current source, having a first terminal coupled to the system voltage and a second terminal;
a first NMOS transistor, having a gate, a source and a drain, wherein the gate and the drain of the first NMOS transistor are coupled to the second terminal of the current source;

a PNP bipolar junction transistor, having an emitter, a collector and a base, wherein the emitter of the PNP bipolar junction transistor is coupled to the source of the first NMOS transistor, and the base and the collector of the PNP bipolar junction transistor are coupled to a reference level;

a second NMOS transistor, having a gate, a source and a drain, wherein the gate of the second NMOS transistor is coupled to the gate of the first NMOS transistor, the drain of the second NMOS transistor is coupled to the drain of the first PMOS transistor; and a resistor, coupled between the source of the second NMOS transistor and the reference level.

14. The random number generator according to claim 13, wherein the oscillation unit comprises:

a third NMOS transistor, having a gate, a source, and a drain, wherein the gate and the drain of the third NMOS transistor are coupled to the drain of the second PMOS transistor, and the source of the third NMOS transistor is coupled to the reference level;

a fourth NMOS transistor, having a gate, a source, and a drain, wherein the gate of the fourth NMOS transistor is coupled to the gate of the third NMOS transistor, and the source of the fourth NMOS transistor is coupled to the reference level;

a fifth NMOS transistor, having a gate, a source, and a drain, wherein the gate of the fifth NMOS transistor is coupled to the gate of the third NMOS transistor, and the source of the fifth NMOS transistor is coupled to the reference level;

a sixth NMOS transistor, having a gate, a source, and a drain, wherein the gate of the sixth NMOS transistor is coupled to the gate of the third NMOS transistor, and the source of the sixth NMOS transistor is coupled to the reference level;

a seventh NMOS transistor, having a gate, a source, and a drain, wherein the source of the seventh NMOS transistor is coupled to the drain of the fourth NMOS transistor;

an eighth NMOS transistor, having a gate, a source, and a drain, wherein the source of the eighth NMOS transistor is coupled to the drain of the fifth NMOS transistor;

a ninth NMOS transistor, having a gate, a source, and a drain, wherein the source of the ninth NMOS transistor is coupled to the drain of the sixth NMOS transistor;

a third PMOS transistor, having a gate, a source, and a drain, wherein the gate of the third PMOS transistor is coupled to the gate of the seventh NMOS transistor, the source of the third PMOS transistor is coupled to the system voltage, and the drain of the third PMOS transistor is coupled to the drain of the seventh NMOS transistor;

a fourth PMOS transistor, having a gate, a source, and a drain, wherein the gate of the fourth PMOS transistor is coupled to the gate of the eighth NMOS transistor and the drain of the third PMOS transistor, the source of the fourth PMOS transistor is coupled to the system voltage, and the drain of the fourth PMOS transistor is coupled to the drain of the eighth NMOS transistor; and a fifth PMOS transistor, having a gate, a source, and a drain, wherein the gate of the fifth PMOS transistor is coupled to the gate of the ninth NMOS transistor and the drain of the fourth PMOS transistor, the source of the fifth PMOS transistor is coupled to the system voltage, and the drain of the fifth PMOS transistor is coupled to the drain of the NMOS transistor and the gate of the third PMOS transistor and outputs the frequency conversion signals thereby.

15. The random number generator according to claim 14, wherein the sampling unit comprises a plurality of D flip-flops, wherein a data output terminal of the $i^{th}$ D flip-flop is coupled to a data input terminal of the $(i+1)^{th}$ D flip-flop; the data input terminal of the $1^{st}$ D flip-flop receives the frequency conversion signal; clock pulse receiving terminals of the D flip-flops receive the sampling clock pulses at the same time; the data output terminals of the D flip-flops are adapted for outputting the random numbers, wherein i is a positive integer.

16. The random number generator according to claim 12, wherein the random number generator is applied in an electronic apparatus or a smart card.

17. A method for generating a random number, comprising:

accumulating and descending a status of a noise generated during a transient of an output signal of the output buffer; and generating a frequency conversion signal which varies according to time and an ambient factor; and sampling the frequency conversion signal according to a sampling clock pulse to obtain a plurality of sets of random number codes.

18. The method for generating a random number according to claim 17, wherein the ambient factor comprises temperature and an ambient light.

19. A method for generating a random number, comprising:

accumulating and descending a status of a noise generated during a transient of an output signal of the output buffer; and generating a frequency conversion signal which varies according to time; and sampling the frequency conversion signal according to a sampling clock pulse to obtain a plurality of sets of random number codes.

20. A method for generating a random number, comprising:

generating a reference oscillation current which varies according to an ambient factor, wherein the ambient factor comprises temperature and/or an ambient light;

generating and providing a frequency conversion signal which varies according to the ambient factor according to the reference oscillation signal; and sampling the frequency conversion signal according to a sampling clock pulse to obtain a plurality of sets of random number codes.

* * * * *